(12) United States Patent
Chang

(10) Patent No.: US 10,389,785 B2
(45) Date of Patent: Aug. 20, 2019

(54) METHOD FOR ADAPTIVELY STREAMING AN AUDIO/VISUAL MATERIAL

(71) Applicant: Wei-Chung Chang, Taipei (TW)

(72) Inventor: Wei-Chung Chang, Taipei (TW)

(*) Notice: Subject to any disclaimer, the term of this patent is extended or adjusted under 35 U.S.C. 154(b) by 209 days.

(21) Appl. No.: 15/649,071

(22) Filed: Jul. 13, 2017

(65) Prior Publication Data

US 2018/0020031 A1  Jan. 18, 2018

Related U.S. Application Data

(60) Provisional application No. 62/363,331, filed on Jul. 17, 2016.

(51) Int. Cl.
| | |
|---|---|
| *H04L 29/06* | (2006.01) |
| *H04L 12/861* | (2013.01) |
| *G06F 3/0481* | (2013.01) |
| *H04L 12/26* | (2006.01) |
| *G06F 3/0484* | (2013.01) |

(52) U.S. Cl.
CPC ........ *H04L 65/602* (2013.01); *G06F 3/04817* (2013.01); *G06F 3/04847* (2013.01); *H04L 65/4069* (2013.01); *H04L 65/4084* (2013.01); *H04L 65/80* (2013.01); *G06F 3/0484* (2013.01); *H04L 43/0882* (2013.01); *H04L 43/16* (2013.01); *H04L 49/90* (2013.01)

(58) Field of Classification Search
CPC ... H04L 65/602; H04L 65/4069; H04L 65/80; H04L 43/0882; H04L 43/16; H04L 49/90; G06F 3/0484; G06F 3/04817
See application file for complete search history.

(56) References Cited

U.S. PATENT DOCUMENTS

| | | | |
|---|---|---|---|
| 7,058,721 B1 * | 6/2006 | Ellison ................. | G11B 27/031 348/E5.008 |
| 2011/0096828 A1 * | 4/2011 | Chen ................. | H04N 21/23106 375/240.02 |
| 2011/0231519 A1 * | 9/2011 | Luby ................. | H04N 21/23106 709/219 |
| 2011/0231569 A1 * | 9/2011 | Luby ................. | H04N 21/23106 709/234 |
| 2011/0239078 A1 * | 9/2011 | Luby ................. | H04N 21/23106 714/752 |

(Continued)

FOREIGN PATENT DOCUMENTS

| | | | | |
|---|---|---|---|---|
| EP | 2486705 A2 * | 8/2012 | ......... | H04N 21/4331 |
| WO | WO-2015054160 A1 * | 4/2015 | ............. | H04L 65/60 |

*Primary Examiner* — Kostas J Katsikis
(74) *Attorney, Agent, or Firm* — Hamre, Schumann, Mueller & Larson, P.C.

(57) ABSTRACT

A method for adaptively streaming an audio/visual (AV) material includes: processing a plurality of current data packets stored in a data buffer to play media segments of the AV material at a current quality; during playback of a current one of the media segments, determining whether a new data packet for playing a candidate one of the media segments at an improved quality is able to be completely downloaded in time; when the determination is affirmative, downloading the new data packet and processing the new data packet to play the candidate one of the media segments of the AV material at the improved quality on the player interface when the new data packet is completely downloaded and stored in the data buffer.

20 Claims, 11 Drawing Sheets

(56) References Cited

U.S. PATENT DOCUMENTS

| | | | |
|---|---|---|---|
| 2012/0042090 A1* | 2/2012 | Chen | H04L 65/604 709/231 |
| 2013/0007223 A1* | 1/2013 | Luby | H04N 21/23106 709/219 |
| 2013/0103849 A1* | 4/2013 | Mao | H04N 21/8456 709/231 |
| 2013/0165084 A1* | 6/2013 | Xu | H04L 67/02 455/414.1 |
| 2014/0003501 A1* | 1/2014 | Soroushian | H04N 19/597 375/240.12 |
| 2014/0003502 A1* | 1/2014 | Soroushian | H04N 19/597 375/240.12 |
| 2014/0003523 A1* | 1/2014 | Soroushian | H04N 19/597 375/240.16 |
| 2014/0003799 A1* | 1/2014 | Soroushian | H04N 9/8227 386/353 |
| 2014/0089469 A1* | 3/2014 | Ramamurthy | H04L 65/60 709/219 |
| 2014/0149557 A1* | 5/2014 | Lohmar | H04L 65/605 709/219 |
| 2014/0270338 A1* | 9/2014 | Zhao | G06T 1/0021 382/100 |
| 2014/0282792 A1* | 9/2014 | Bao | H04N 21/44004 725/116 |
| 2014/0317234 A1* | 10/2014 | Mueller | H04L 47/10 709/217 |
| 2015/0036051 A1* | 2/2015 | Broberg | H04N 5/91 348/571 |
| 2015/0095508 A1* | 4/2015 | Somayazulu | H04N 21/631 709/231 |
| 2015/0100701 A1* | 4/2015 | Mao | H04L 65/60 709/231 |
| 2015/0271237 A1* | 9/2015 | Stockhammer | H04N 21/234 709/219 |
| 2015/0319214 A1* | 11/2015 | Yu | H04L 65/4069 709/219 |
| 2015/0373075 A1* | 12/2015 | Perlman | H04L 65/608 709/217 |
| 2015/0373077 A1* | 12/2015 | Ramamurthi | H04W 36/14 709/219 |
| 2016/0014418 A1* | 1/2016 | Shao | H04N 19/149 375/240.02 |
| 2016/0127260 A1* | 5/2016 | Gordon | H04L 47/783 709/226 |
| 2016/0134673 A1* | 5/2016 | MacInnis | H04L 65/60 709/231 |
| 2016/0150255 A1* | 5/2016 | Grinshpun | H04N 21/23805 725/62 |
| 2016/0182594 A1* | 6/2016 | White | H04L 65/607 709/219 |
| 2016/0191307 A1* | 6/2016 | Zhao | H04L 41/082 709/221 |
| 2016/0234282 A1* | 8/2016 | Lederer | H04L 65/608 |
| 2016/0234549 A1* | 8/2016 | Ducloux | H04N 21/23439 |
| 2016/0366488 A1* | 12/2016 | Long | H04N 21/6125 |
| 2017/0111670 A1* | 4/2017 | Ducloux | H04N 19/40 |
| 2017/0126765 A1* | 5/2017 | Taibi | H04L 65/4084 |
| 2017/0324652 A1* | 11/2017 | Lee | H04L 67/322 |
| 2017/0347136 A1* | 11/2017 | Frantz | G11B 27/10 |
| 2018/0020035 A1* | 1/2018 | Boggia | H04L 65/4084 |
| 2018/0034880 A1* | 2/2018 | Choi | H04L 65/4069 |
| 2018/0359297 A1* | 12/2018 | Mih Ly | H04L 65/4084 |

\* cited by examiner

| Quality | Bitrate index | Bitrate | Width | Length |
|---|---|---|---|---|
| 1 | B1 | 116290 | 256 | 144 |
| 2 | B2 | 252790 | 426 | 240 |
| 3 | B3 | 640694 | 640 | 360 |
| 4 | B4 | 1172416 | 854 | 480 |
| 5 | B5 | 3485544 | 1280 | 720 |
| 6 | B6 | 5906690 | 1920 | 1080 |
| 7 | B7 | -- | -- | -- |

| N+9 | N+8 | N+7 | N+6 | N+5 | N+4 | N+3 | N+2 | N+1 | N |

| Segment index (i) | Start time (sec) | Duration (sec) |
|---|---|---|
| N | 30 | 3 |
| N+1 | 33 | 3 |
| N+2 | 36 | 3 |
| ... | ... | ... |
| N+9 | 57 | 3 |

FIG.5

| $S_{19}$ | $S_{18}$ | $S_{17}$ | $S_{16}$ | $S_{15}$ | $S_{14}$ | $S_{13}$ | $S_{12}$ | $S_{11}$ | $S_{10}$ |
| 1172416 | 1172416 | 640694 | 640694 | 640694 | 252790 | 640694 | 640694 | 252790 | 252790 |

| Segment index (i) | Bitrate | Start time (sec) | Duration (sec) |
|---|---|---|---|
| N | 252790 | 30 | 3 |
| N+1 | 252790 | 33 | 3 |
| N+2 | 640694 | 36 | 3 |
| ... | ... | ... | ... |
| N+9 | 1172416 | 57 | 3 |

FIG.6

| Index | 1 | 2 | 3 | 4 | 5 | 6 | 7 | 8 | 9 | 10 |
|---|---|---|---|---|---|---|---|---|---|---|
| Current Quality | 2 | 2 | 1 | 2 | 2 | 3 | 4 | 3 | 2 | 4 |
| Target Quality | 3 | 3 | 3 | 3 | 3 | 3 | 3 | 3 | 3 | 3 |
| degree improvement (index) | 1 | 1 | 2 | 1 | 1 | 0 | 0 | 0 | 1 | 0 |

FIG.8A

| Index | 1 | 2 | 3 | 4 | 5 | 6 | 7 | 8 | 9 | 10 |
|---|---|---|---|---|---|---|---|---|---|---|
| Current Quality | 2 | 2 | 1 | 2 | 2 | 3 | 4 | 3 | 2 | 4 |
| Target Quality | 2+1 | 2+1 | 1+1 | 2+1 | 2+1 | 3+1 | 4+1 | 3+1 | 2+1 | 4+1 |
| degree improvement (index) | 1 | 1 | 1 | 1 | 1 | 1 | 1 | 1 | 1 | 1 |

FIG.8B

| Index | 1 | 2 | 3 | 4 | 5 | 6 | 7 | 8 | 9 | 10 |
|---|---|---|---|---|---|---|---|---|---|---|
| Current Quality | 2 | 2 | 1 | 2 | 2 | 3 | 4 | 3 | 2 | 4 |
| Number of request received | 2 ||||||||||
| Target Quality | 4 ||||||||||
| degree improvement (index) | 1 | 1 | 2 | 1 | 1 | 0 | 0 | 0 | 1 | 0 |

FIG.8C

Offset($S_{10}$) = 2.5 Seconds

| $S_{19}$ | $S_{18}$ | $S_{17}$ | $S_{16}$ | $S_{15}$ | $S_{14}$ | $S_{13}$ | $S_{12}$ | $S_{11}$ | $S_{10}$ |
|---|---|---|---|---|---|---|---|---|---|
| 1172416 | 1172416 | 640694 | 640694 | 640694 | 252790 | 640694 | 640694 | 252790 | 252790 |

| Segment index (i) | Bitrate | Start time (sec) | Duration (sec) |
|---|---|---|---|
| N | 252790 | 30 | 3 |
| N+1 | 252790 | 33 | 3 |
| N+2 | 640694 | 36 | 3 |
| ... | ... | ... | ... |
| N+9 | 1172416 | 57 | 3 |

FIG.10

Offset($S_{16}$) = 2.5 Seconds

| $S_{19}$ | $S_{18}$ | $S_{17}$ | $S_{16}$ |
|---|---|---|---|
| 1172416 | 1172416 | 640694 | 640694 |

| Segment index (i) | Bitrate | Start time (sec) | Duration (sec) |
|---|---|---|---|
| $S_{16}$ | 640694 | 48 | 3 |
| $S_{17}$ | 640694 | 51 | 3 |
| $S_{18}$ | 1172416 | 54 | 3 |
| $S_{19}$ | 1172416 | 57 | 3 |

FIG.11

Offset($S_{14}$) = 0 Seconds

| $S_{19}$ | $S_{18}$ | $S_{17}$ | $S_{16}$ | $S_{15}$ | $S_{14}$ |
|---|---|---|---|---|---|
| 1172416 | 1172416 | 640694 | 640694 | 640694 | 252790 |

| Segment index (i) | Bitrate | Start time (sec) | Duration (sec) | Degree of improvement | Downloadable data by start time |
|---|---|---|---|---|---|
| $S_{14}$ | 252790 | 42 | 3 | 2 | - - |
| $S_{15}$ | 640694 | 45 | 3 | 1 | 2700000 |
| $S_{16}$ | 640694 | 48 | 3 | 1 | 5400000 |
| $S_{17}$ | 640694 | 51 | 3 | 1 | |
| $S_{18}$ | 1172416 | 54 | 3 | 0 | |
| $S_{19}$ | 1172416 | 57 | 3 | 0 | |

FIG.12

METHOD FOR ADAPTIVELY STREAMING AN AUDIO/VISUAL MATERIAL

CROSS-REFERENCE TO RELATED APPLICATION

This application claims priority of Provisional Patent Application No. 62/363,331, filed on Jul. 18, 2016.

FIELD

The disclosure relates to a method for adaptively streaming an audio/visual material.

BACKGROUND

Nowadays, the technology of streaming media files for playing an audio/visual material (e.g., a video, an audio media, etc.) on an electronic device has become common. In general, the media files demanded by a user are requested by the electronic device and subsequently received from a data server via a network such as the Internet. Typically, the audio/visual material may be available from the data server in a number of different qualities. A user may designate one of the qualities, or authorize a player application to dynamically determine a suitable quality during the playing of the audio/visual material. This technology may be referred to as adaptive bitrate streaming.

A number of ways may be employed for implementing adaptive bitrate streaming. For example, the HyperText Transfer Protocol (HTTP) may be used in transmitting data over a computer network. The player application may continuously detect a network bandwidth and a capacity of a central processing unit (CPU) of the electronic device. When the user operates the electronic device to control the player application to start playing the audio/visual material, the CPU transmits a request to a source of the streaming media files, requesting data packets constituting media file segments having a lowest quality. Afterward, the electronic device starts downloading the data packets that constitute the media file segments, stores the data packets in a data buffer of a memory device of the electronic device, and starts playing the media file segments sequentially (that is, using an interface to "play" the media file segments for the user).

During the playing of the media file segments, the CPU compares the network bandwidth with a bitrate of the media file segments, and determines whether a higher quality may be achieved.

It is noted that, when all of the media file segments constituted by the data packets stored in the data buffer has been played, and new data packets constituting a new media file segment have not been completely downloaded yet, the playing may be forcibly paused, entering a buffering state to wait for the new data packets to be downloaded in full. Such an event may be referred to as stalling.

SUMMARY

One object of the disclosure is to provide a method that enables improvement of streaming of an audio/visual (AV) material when feasible, without causing stalling.

According to one embodiment of the disclosure, the method is implemented by an electronic device that includes a processor, a memory device having a data buffer, and a display. The data buffer stores plurality of current data packets that constitute a plurality of successive media segments of the AV material, respectively. The method includes:

generating, by the processor, a player interface on the display;

processing, by the processor, the current data packets stored in the data buffer to play the media segments of the AV material at a current quality on the player interface one by one;

during playback of a current one of the media segments, determining, by the processor for a candidate one of the media segments after the current one, whether a new data packet for playing the candidate one of the media segments at an improved quality higher than the current quality is able to be completely downloaded before the candidate one of the media segments is expected to be played, based on a current network bandwidth of a network between the electronic device and a server that provides the new data packet, and an amount of the current data packets currently stored in the data buffer;

when the determination is affirmative, downloading the new data packet; and processing, by the processor, the new data packet when the new data packet is completely downloaded and stored in the data buffer to play the candidate one of the media segments of the AV material at the improved quality on the player interface at the time when the candidate one of the media segments is expected to be played.

Another object of the disclosure is to provide an electronic device that is capable of performing the above-mentioned method.

According to one embodiment of the disclosure, the electronic device includes a processor, a memory device having a data buffer, and a display. The data buffer stores a plurality of current data packets that constitute a plurality of successive media segments of an audio/visual (AV) material, respectively. The processor is programmed to perform operations including:

generating a player interface on the display;

processing the current data packets stored in the data buffer to play the media segments of the AV material at a current quality on the player interface one by one;

during playback of a current one of the media segments, determining, for a candidate one of the media segments after the current one, whether a new data packet for playing the candidate one of the media segments at an improved quality higher than the current quality is able to be completely downloaded before the candidate one of the media segments is expected to be played, based on a current network bandwidth of a network between the electronic device and a server that provides the new data packet, and an amount of the current data packets currently stored in the data buffer;

when the determination is affirmative, downloading the new data packet; and processing the new data packet when the new data packet is completely downloaded and stored in the data buffer to play the candidate one of the media segments of the AV material at the improved quality on the player interface at the time when the candidate one of the media segments is expected to be played.

Yet another object of the disclosure is to provide a non-transitory computer-readable medium storing instructions that, when executed by a processor, cause the processor to perform the above-mentioned method.

BRIEF DESCRIPTION OF THE DRAWINGS

Other features and advantages of the disclosure will become apparent in the following detailed description of the embodiments with reference to the accompanying drawings, of which:

FIG. 5 illustrates a series of media segments of the audio/visual material;

FIG. 6 illustrates additional parameters regarding the media segments;

FIGS. 8A to 8C illustrate a number of ways for obtaining a degree of improvement for the media segments;

FIGS. 10 to 12 illustrate the status of the media segments at different time instances.

DETAILED DESCRIPTION

Figure 1A:
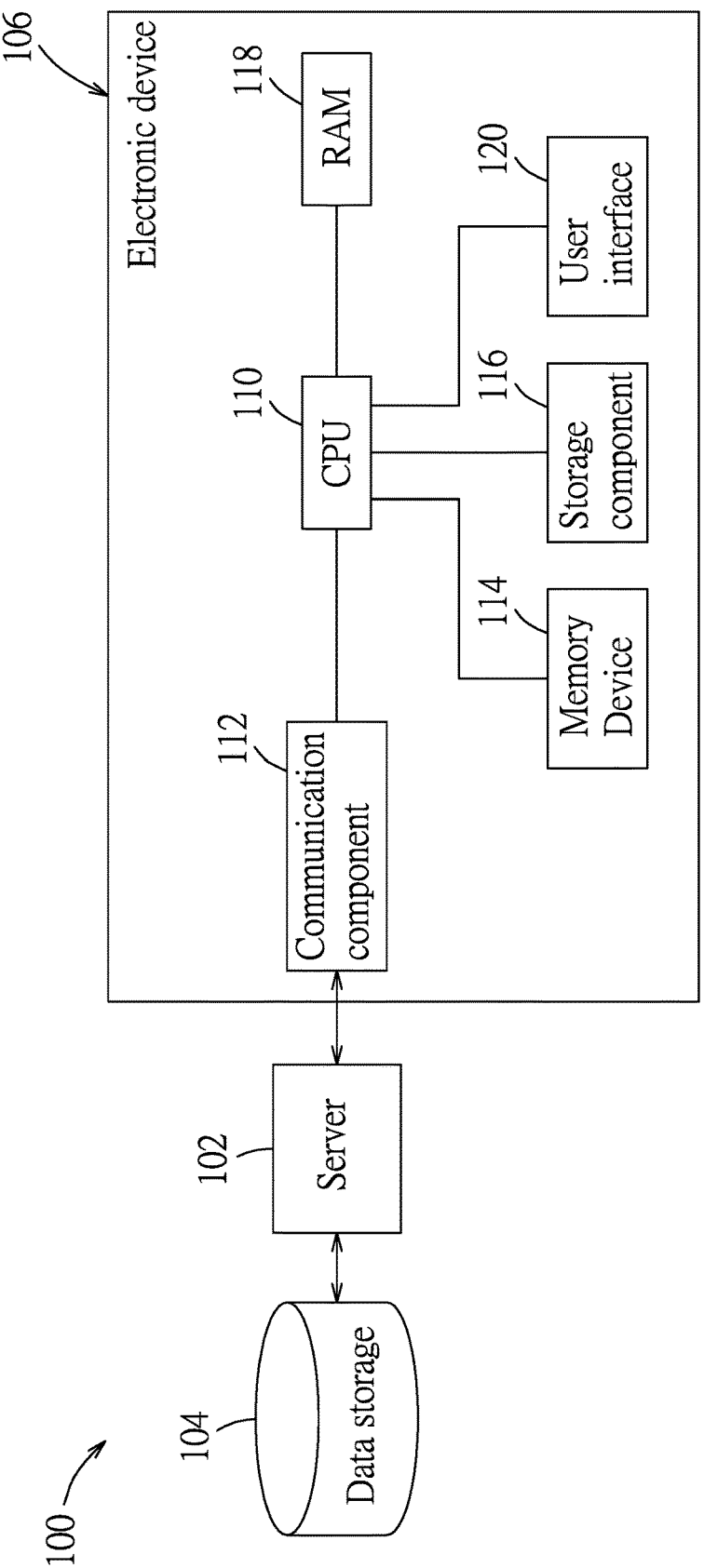
FIG. 1A is a block diagram illustrating a system for adaptively streaming an audio/visual material according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1B:
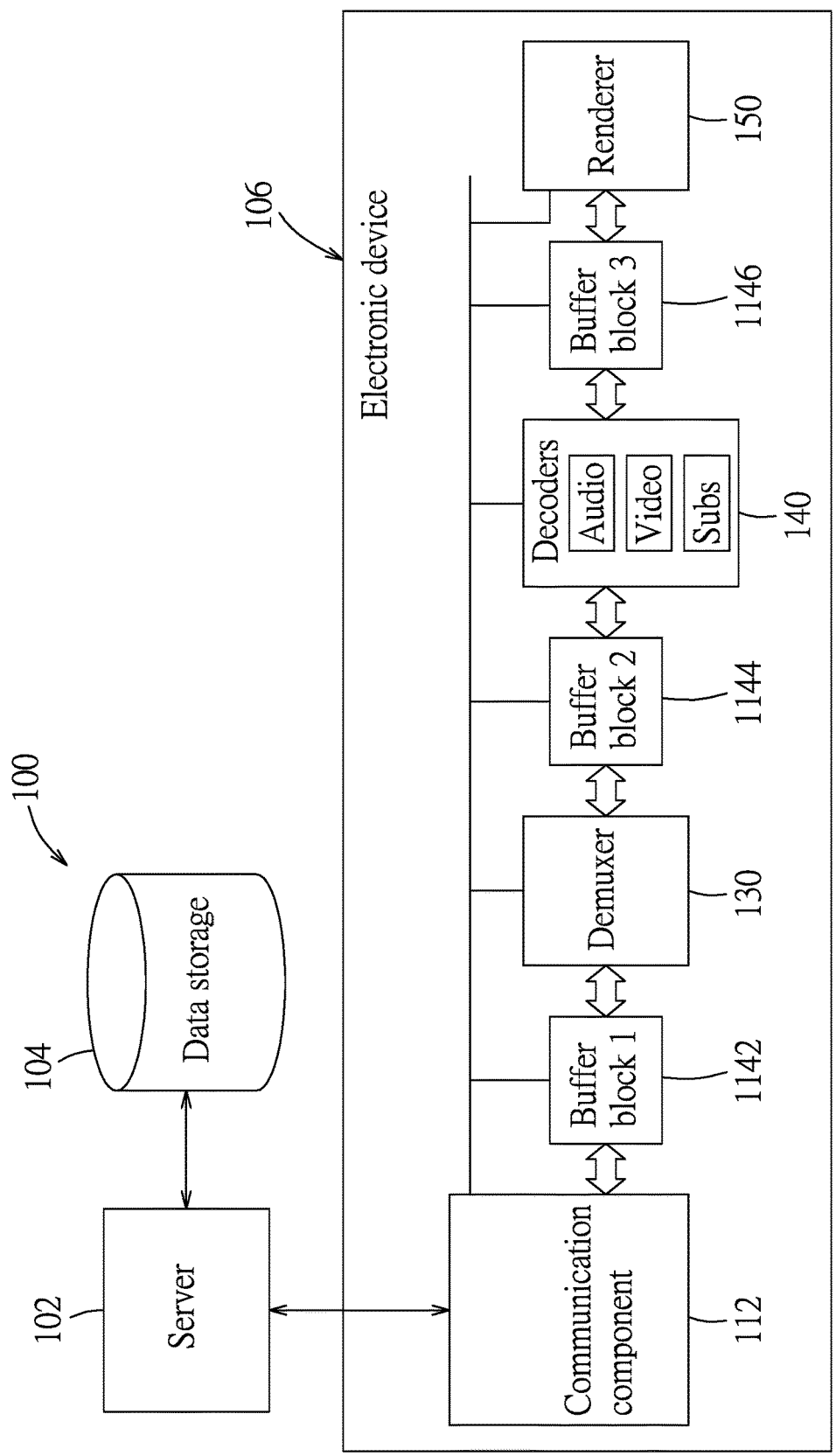
FIG. 1B illustrates a pipeline of the system of FIG. 1A.

FIG. 1A is a block diagram illustrating a system 100 for adaptively streaming an audio/visual (AV) material according to one embodiment of the disclosure, and FIG. 1B illustrates a pipeline of the system 100. The system 100 includes a server 102, a data storage 104 and an electronic device 106.

The server 102 is embodied using a computer device, and is configured to communicate with the electronic device 106 via a network (e.g., the Internet).

The data storage 104 is coupled to the server 102, and may be embodied using a hard disk array storing data accessible by the server 102.

The electronic device 106 may be embodied using a personal computer, a laptop, a tablet, a personal digital assistant, a mobile device, a cellular phone, etc.

The electronic device 106 includes a processor 110, a communication component 112, a memory device 114, a storage component 116, a random access memory (RAM) 118 and a user interface 120.

The processor 110 may be embodied using a central processing unit (CPU), and is capable of executing machine instructions to perform various operations.

The communication component 112 may be controlled by the processor 110 to establish a network connection with the server 102 via the network. The network connection may be wired or wireless (e.g., a cellular network such as long-term evolution (LTE), LTE advanced, etc.).

The memory device 114 may include a number of data buffers for storing data therein. In this embodiment, the memory device 114 is embodied using a physical memory (e.g., flash RAM), and has three data buffer blocks 1142, 1144 and 1146.

The storage component 116 may be embodied using a non-transitory storage medium such as a hard disk, a solid state disk, a flash storage (e.g., a universal flash storage (UFS)), etc. The storage component 116 may store a player application therein. The player application includes instructions that, when loaded into the RAM 118 and executed by the processor 110, cause the processor 110 to perform various operations. For example, the processor 110 executing the instructions of the player application may perform functions of a media demultiplexer (demuxer) 130, a number of decoders 140 and a renderer 150.

The user interface 120 includes a display screen, an input mechanism and an electronic speaker. For example, the display screen and the input mechanism of the user interface 120 may be integrated as a touch screen allowing interaction with the user. In other examples, the input mechanism may include a keyboard, a mouse, a stylus pen/graphics tablet, etc.

The electronic device 106 may also include other components that are built-in the electronic device 106 and/or externally connected thereto via a wired or a wireless connection (e.g., Bluetooth®) to serve as the user interface 120. For example, the electronic device 106 may further include a microphone, a camera, a touch panel, and/or a sound recorder, etc.

In this embodiment, the electronic device 106 is embodied using a mobile phone, and the network connection is established using a cellular network technology such as LTE/LTE advanced.

When the user intends to watch/listen to an audio/visual (AV) material (e.g., a video, an audio media, etc.) from an online source (e.g., the server 102), he/she may operate the electronic device 106 to execute the player application. For example, the user may operate a web browser to access a link of a website containing a media file for playing the AV material, and request the media file to be downloaded to the electronic device 106.

In response to the user operation, the processor 110 controls the communication component 112 to transmit a request for the media file to the server 102 in order to download and process the media file, a process referred to as "streaming". In turn, the server 102 starts transmitting parts of the media file stored in the data storage 104. The parts of the media file may be transmitted to the electronic device 106 over the network, in the form of data packets.

The data packets received by the communication component 112 are first stored in the data buffer 1142. Under execution of the player application, the demuxer 130 performs a demultiplexing operation in order to extract individual elementary streams (e.g., audio, video, subtitles, etc.) from the data packets stored in the data buffer 1142. The elementary streams are then stored in the data buffer 1144.

Under execution of the player application, the decoders 140 are configured to perform decoding operations to decode the elementary streams, respectively. As a result, a number of decoded frames, each including a timestamp indicating a time instance within a duration of the media file, are generated and stored in the data buffer 1146.

Afterward, under execution of the player application, the renderer 150 retrieves the decoded frames from the data buffer 1146, and renders (i.e., plays) the decoded frames sequentially based on the respective timestamps. The user is therefore able to watch/listen to segments of the AV material corresponding to the parts of the media file that have been downloaded, processed and rendered.

Figure 2:
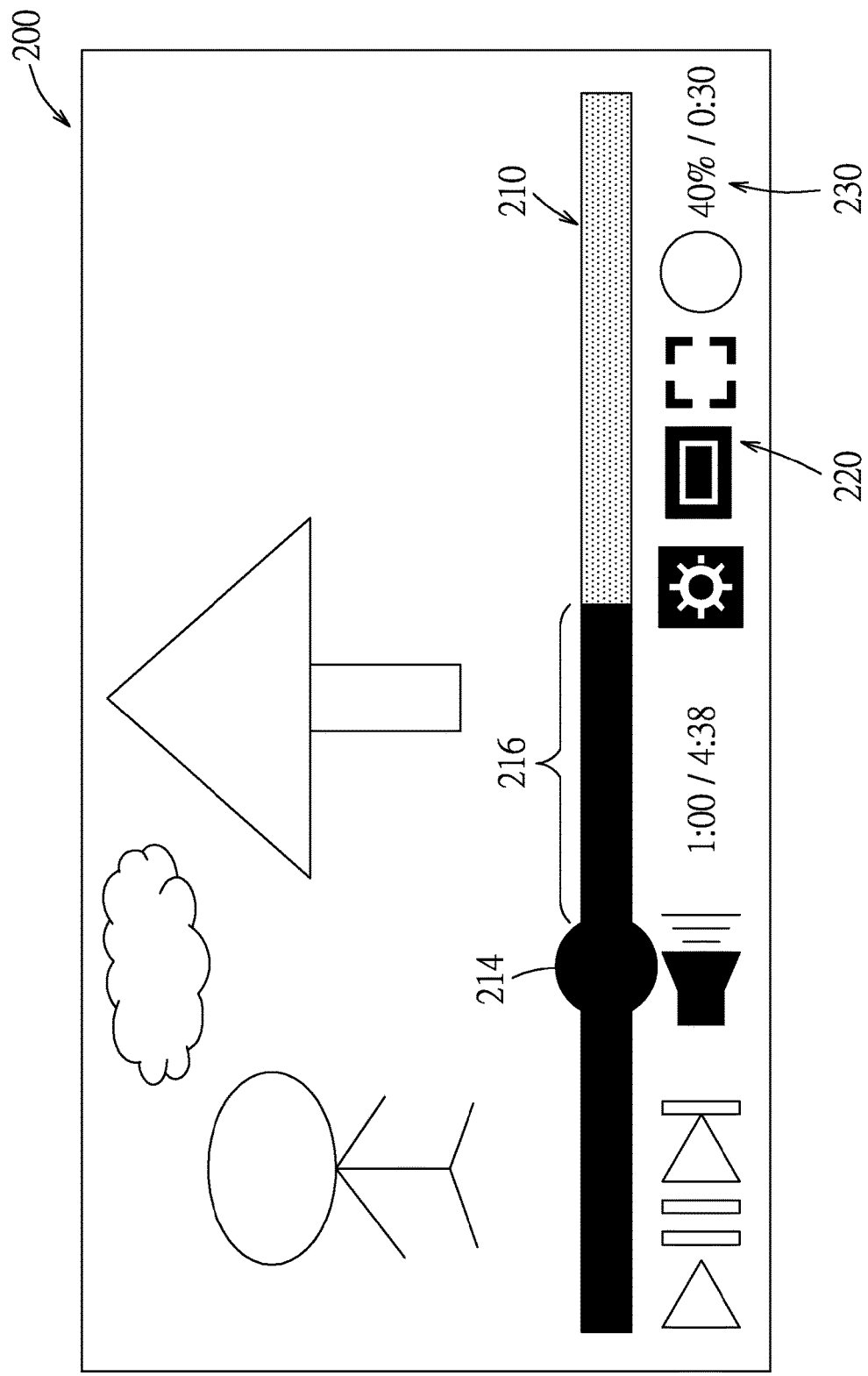
FIG. 2 illustrates an exemplary player interface for playing the audio/visual material.

In this embodiment, playback of the AV material may be done by the processor 110 generating a player interface 200 on the display screen, as shown in FIG. 2. Specifically, the processor 110 may process the data packets stored in the data buffers 1142, 1144 and 1146 to play the media segments of the AV material at a current quality on the player interface 200 one by one.

The player interface 200 includes a media playing section for displaying the decoded frames, and a manual control section. The manual control section may include a progress bar 210, a control set 220 and an icon set 230.

The progress bar 210 includes a current playback location icon 214, and a buffered section 216 illustrating a portion of the media file that has been downloaded and processed. That is to say, even if the network connection between the electronic device 106 and the server 102 is now disabled, the user is still able to watch/listen to the content of the AV material up to the end of the buffered section 216.

The control set 220 may include control options for allowing the user to play/pause the AV material, to adjust a volume, to switch between a normal mode and a full screen mode, and to select a desired quality from a number of qualities that are available in the server 102 for the AV material. In some embodiments, if the user does not specify a desired quality, the processor 110 may request parts of the media file in a default quality based on a type of the network connection. For example, when it is detected that the network connection is established using a wired connection or Wi-Fi, the default quality may be set to a higher level of the available qualities (e.g., 720p, 1080p, etc.). On the other hand, when it is detected that the network connection is established using a cellular network connection (e.g., 3G telecommunication network, LTE, LTE advanced, etc.), the default quality may be set to a lower level of the available qualities (e.g., 360p, 480p, etc.).

Figures 3, 4:
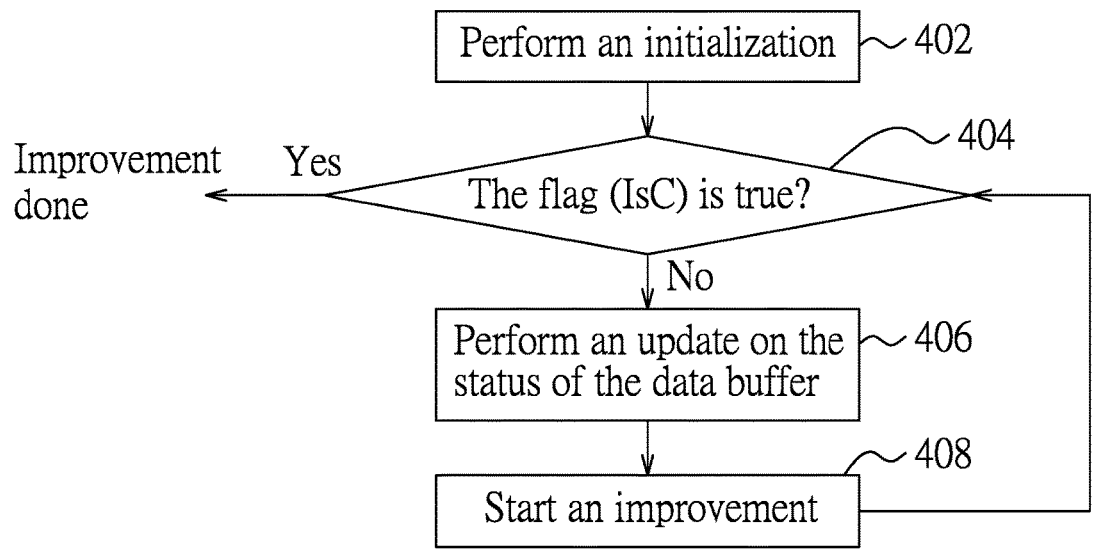
FIG. 3 illustrates a number of exemplary qualities for playback of a media segment of the audio/visual material with associated bitrates.
FIG. 4 is a flow chart illustrating a method for adaptively streaming the audio/visual material according to one embodiment of the disclosure.

It is noted that at a higher quality, more details of the AV material can be included and provide a better experience to the user, in the expense of an enlarged file size of the media file. On the other hand, media files with a lower quality are smaller in size and faster to download, but may be less than satisfactory to the user. For example, a low quality video may look somewhat blurred to the user. FIG. 3 illustrates a number of exemplary qualities, with respective bitrates (bits per second).

In some embodiments, when the network connection is established using a cellular network connection, it may not be feasible to continuously implement the streaming of a media file at a relatively high quality due to a number of reasons. For example, a network capacity (e.g., a network bandwidth) of the cellular network connection may be unstable, and may not be consistently sufficient for downloading of the high quality parts of the media file, which are inherently larger in size, without causing stalling of the playback of the AV material. Additionally, the large amount of downloaded data may incur additional service charges to the user without an unlimited data plan from a networking service provider. Thus, a lower quality is typically recommended as a default quality in such a condition.

However, there may be instances where the user demands to view/listen to a certain media segment of the AV material (e.g., an important play in a ballgame) at an improved quality. In such cases, during the playback of the AV material, the user may transmit a request to the electronic device 106 via the user interface 120 requesting for a temporary quality improvement.

In some embodiments, the request may be in the form of a predetermined gesture inputted via the user interface (e.g., a number of touch signals on the touch screen resulted from a user gesture), a physical gesture captured by a camera communicating with the processor 110, an interaction with a button displayed on the Mayer interface 200 (e.g., a user confirmation icon included in the icon set 230), an interaction with one or more physical buttons on one of the electronic device 110 and a remote device communicating with the electronic device 110, and a voice command captured by a sound recorder communicating with the processor 110.

In response to the request from the user, the processor 110 is programmed to perform a method for adaptively streaming the AV material. FIG. 4 is a flow chart illustrating steps of the method, according to one embodiment of the disclosure.

In step 402, the user interface 120 receives the request, and the processor 110 performs an initialization. Specifically, for initialization, the processor 110 sets a flag (IsC) as false (e.g., a binary number 0) indicating that the method is not to be terminated, and sets a flag (Fti) as false (e.g., a binary number 0) indicating that a request for forced improvement is not received. It is noted that, during any stage of the method, when it is determined that a request for forced improvement is received from the user interface 120, the flag (Fti) is set to true.

In step 404, the processor 110 determines whether the flag (IsC) is true. Specifically, a number of incidents may cause the flag (IsC) to become true, such as an occurrence of a network timeout longer than a pre-calculated timeout threshold. When it determined, at any point during the process of the method, that the flag (IsC) is true, the method is terminated. Otherwise, the flow proceeds to step 406.

In step 406, the processor 110 attempts to perform an update on the status of the data buffers 1142 to 1146 at the instant of the request from the user, in order to determine whether the temporary quality improvement may be implemented without causing stalling or additional buffering.

Specifically, the data stored in the data buffer 1142 were received in the form of a plurality of current data packets. After processing, the data stored in the data buffer 1146 is in the form of decoded media frames that constitute a plurality of successive media segments of the AV material. Each of the media segments can be rendered to "play" for a predetermined time duration (e.g., 3 seconds).

In one example as illustrated in FIG. 5, the current data packets constituting ten media segments are stored in sequence in the data buffer 1146 based on the time stamps, and a pipeline of the media segments starts at the media segment (N) that starts at a specific time instance of the AV material (e.g., at 00:30). A last one of the media segments (N+9) in the pipeline starts at (00:57) and has a duration of three seconds, and the ten media segments cooperatively constitute a playing duration of 30 seconds, during which the renderer 150 is able to continuously play the AV material without downloading additional data packets. In some embodiments, the processor 110 continuously calculates the playing duration of the media segments as a whole based on the amount of the current data packets currently stored in the data buffer 1146, and controls the player interface 200 to display the playing duration thus calculated.

It is noted that, during the playing of the AV material, depending on a current bandwidth of the network connection and/or a capacity of the memory device 114, the number of media segments (received in the form of data packets) that are stored in the data buffer 1146 and that are available for playing may continuously change.

FIG. 6 illustrates the different sizes of the media segments, represented by the various titrates. It is noted that the method is typically implemented during the rendering of one of the media segments. For example, when the current playback time of the AV material is 00:31, it may be implied that the current media segment ($S_{10}$) has been played for one second. That is to say, the current media segment ($S_{10}$) has an offset of one second. Moreover, the last one of the media segments may be only partially downloaded. For example, the media segment ($S_{19}$) may include only one second's worth of the AV material. Therefore, without additional data packet, the renderer 150 may play the AV material until 00:58.

That is to say, in step 406, during playing of a current one of the media segments, the processor 110 determines, for a candidate one of the media segments after the current one, whether at least one new data packet for playing the candidate one of the media segments at an improved quality higher (i.e., better, clearer, more detailed, etc.) than the current quality is able to be completely downloaded before the candidate one of the media segments is expected to be played.

Figure 7:
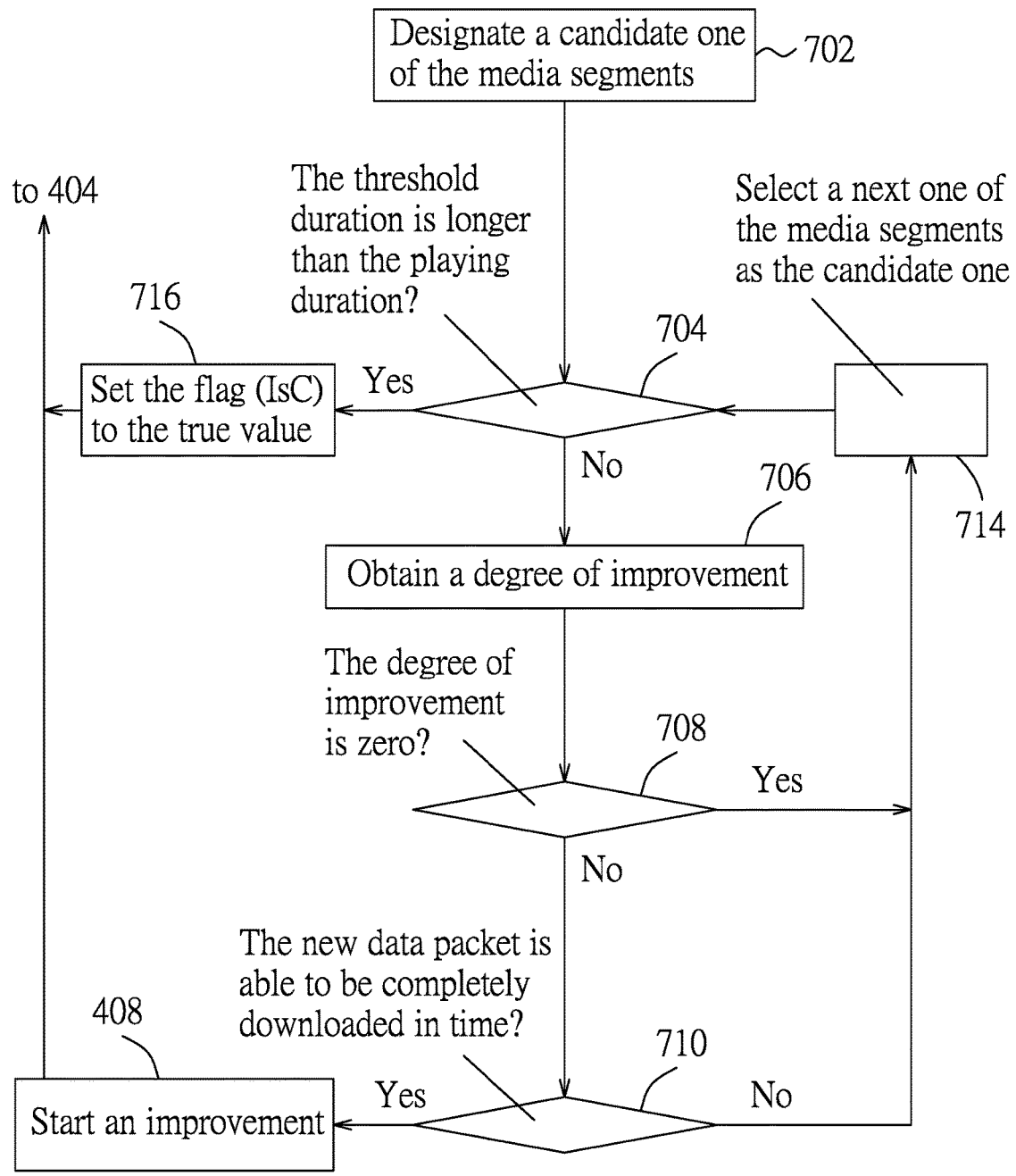
FIG. 7 is a flow chart illustrating a process for determining whether a temporary quality improvement may be implemented without causing stalling.

FIG. 7 is a flow chart illustrating sub-steps associated with step 406.

In sub-step 702, the processor 110 designates a candidate one of the media segments. In this embodiment, the processor 110 identifies the current one of the media segments that is being played ($S_{10}$), and selects a next one of the media segments immediately succeeding the current one of the media segments as the candidate one. Taking the example of FIG. 6, the media segment ($S_{11}$) is designated as the candidate one.

In sub-step 704, the processor 110 calculates the playing duration, and compares the playing duration with a threshold duration (e.g., 10 or 15 seconds). When it is determined that the threshold duration is longer than the playing duration, the flow proceeds to sub-step 716, in which the processor 110 may determine that a temporary quality improvement is not feasible, and sets the flag (IsC) to the true value, thereby terminating the method. Otherwise, the flow proceeds to sub-step 706.

In sub-step 706, the processor 110 obtains, for the candidate one of the media segments, a degree of improvement that indicates a difference between a level of the current quality and a level of an improved quality. In general, there are seven levels of available qualities (i.e., 144p, 240p, 360p, 480p, 720p, 1080p and 1440p) for a streaming video. For example, when the current quality is 360p (level 3) and the improved quality is desired to be 720p (level 5), the degree of improvement is equal to 2.

Specifically, the improved quality may be a default quality that is available, or may be set by the user. For example, the user may manually set a target quality as the improved quality, and the processor 10 may then calculate the degree of improvement as a difference between the target quality and the current quality.

In other examples, the degree of improvement is obtained based on the request received via the user interface 120. For example, when the user inputs the request twice successively, the degree of improvement is set as 2.

As shown in FIG. 8A, ten media segments to be played at respective current qualities, selected from the seven levels of the available qualities (i.e., level 1 to level 7), are shown. Assume that the user inputs the request once during the playing of the first one of the media segments. Since the current quality of the first one of the media segments is level 2, the processor 110 increments the current quality by one to obtain the level 3, and sets the target quality for all media segments to 3. The degree of improvement for all media segments may then be calculated. It is noted that for the media segments) at the level of the current quality equal to or higher (better) than 3, the degree of improvement is set to 0.

In another example as shown in FIG. 8B, after the user inputs the request once during the playing of the first one of the media segments, the processor 110 sets the degree of improvement for all media segments to 1.

In another example as shown in FIG. 8C, after the user inputs the request twice during the playing of the first one of the media segments, the processor 110 identifies a lowest quality (i.e., level 2) among the stored media segments, increments the lowest quality by 2, and sets the target quality for all media segments to 4. The degree of improvement for all media segments may then be calculated. It is noted that for the media segment(s) at the level of the current quality equal to or better than 4, the degree of improvement is set to 0. In this embodiment, the degree of improvement is determined using the process as illustrated in FIG. 8C, and since none of the current qualities of the media segments exceed level 4, the target quality for all media segments is set at 4.

After obtaining the degree of improvement for the candidate one of the media segments, in sub-step 708, the processor 110 determines whether the degree of improvement is zero for the candidate one of the media segments. When it is determined that the degree of improvement is zero, the flow proceeds to sub-step 714, in which the processor 110 selects a next one of the media segments immediately succeeding the media segment that is considered in sub-step 706 as the candidate one (e.g., ($S_{12}$)), and repeats sub-steps 704 to 708.

Otherwise, i.e., when it is determined that the degree of improvement is non-zero (i.e., greater than zero), the flow proceeds to sub-step 710, in which the processor 110 determines whether at least one new data packet for playing the candidate one of the media segments at the target quality is able to be completely downloaded before the candidate one of the media segments is expected to be played. This may be done based on a current network bandwidth of the network between the electronic device 106 and the server 102 that provides the at least one new data packet, and a number of the current data packets currently stored in the data buffers 1142 to 1146.

Specifically, the processor 110 first estimates a downloadable amount of data before the candidate one of the media segments is to be played. In the example as shown in FIG. 6, when the media segment ($S_{11}$), starting at 00:33, is the candidate one of the media segments, and the current playback time is at 00:31, the processor 110 estimates the amount of data that can be downloaded within the next two seconds.

Next, the processor 110 calculates a size of the at least one new data packet that constitutes the candidate one of the media segments at the target quality, and compares the downloadable amount of data and the size of the at least one new data packet.

The following Table 1 shows a number of parameters associated with the estimations.

TABLE 1

| Parameter | Value |
| --- | --- |
| Candidate index | 11 |
| Duration of current segment (seconds) | 3 |
| Offset (seconds) | 1 |
| Distance between candidate segment and current segment | 0 |
| Time of download (seconds) | 2 |
| Current Bandwidth (bits per second) | 2500000 |
| Estimated downloadable amount (bits) | 3750000 |
| Duration of candidate segment (seconds) | 3 |
| Current quality | 3 |
| Target quality | 4 |
| New packet bitrate | 1172416 |
| New packet size | 3517248 |
| Determination | Affirmative |

Based on the above Table 1, with two seconds of time for download, the downloadable amount of data may be estimated as 3750000 bits. This is done by defining a fraction (e.g., 75%) of a theoretical amount of downloadable data (2*2500000=5000000 bits) as the estimation, as specified in the ExoPlayer published by Google Inc.

The bitrate of the at least one new data packet constituting the media segment of the target quality may be found in FIG. 3, where the bitrate for level 4 of the quality is 1172416. As a result, the size of the at least one new data packet should be (1172416*3)=3517258. That is to say, based on the current network bandwidth, it is estimated that the at least one new data packet for improving the quality of the media segment ($S_{11}$) may be completely downloaded and processed by the time instance when the media segment ($S_{11}$) is expected to be played, which is 00:33.

When the determination in sub-step 710 is affirmative, the flow proceeds to step 408. Otherwise, the flow proceeds to sub-step 714.

In some embodiments, the processor 110 may further determine whether a request for forced improvement, indicating that the user intends to view the next one of the media segments at the target quality regardless of potential stalling, is received. When the request for forced improvement is received, the flow proceeds to step 408 regardless of the determination made in sub-step 710.

In step 408, the processor 110 controls the communication component 112 to transmit a request for the new packet(s) to the server 102, so as to start the "improvement" of the candidate one of the media segments.

Figure 9:
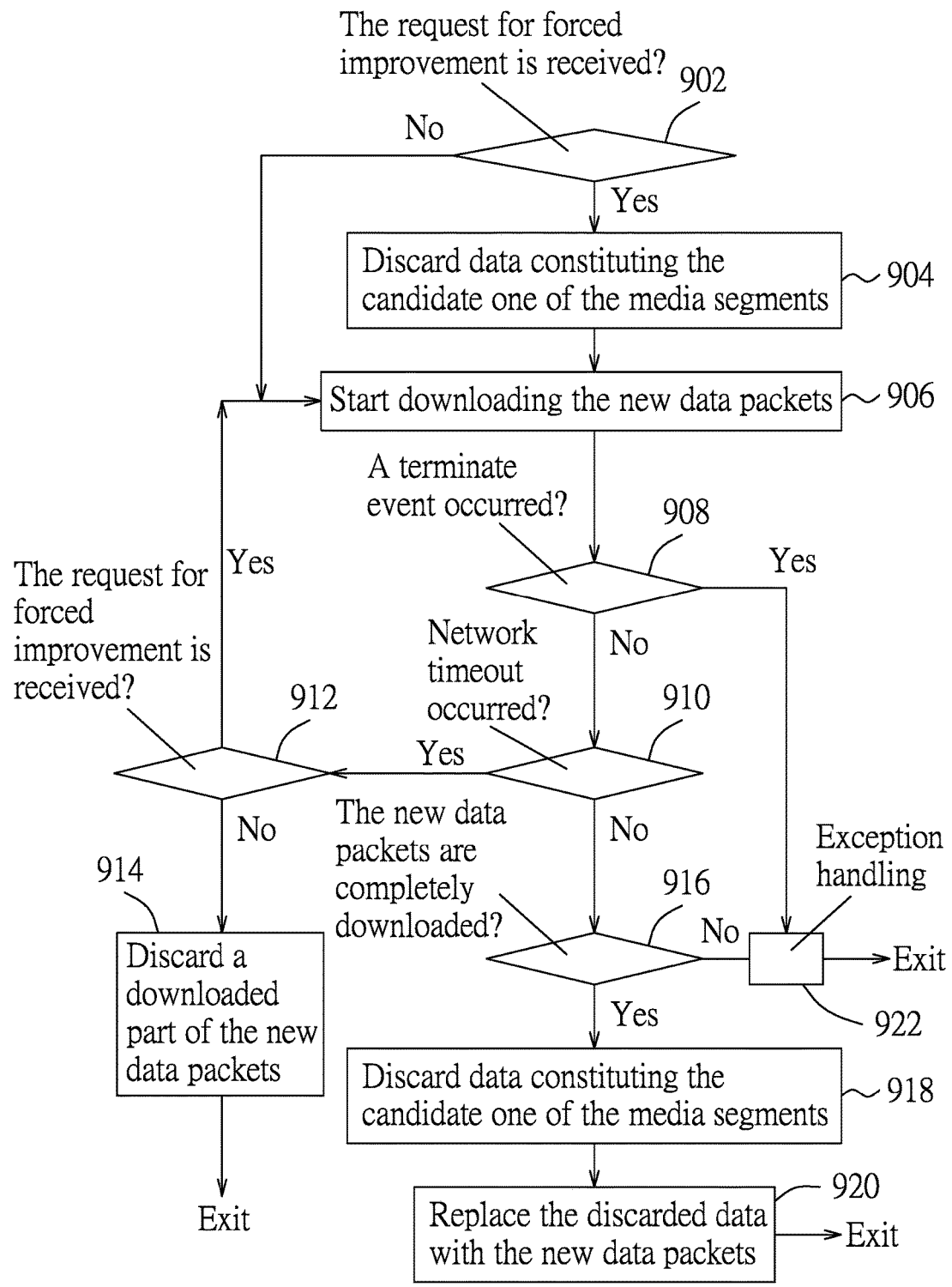
FIG. 9 is a flow chart illustrating a process for downloading at least one new data packet for a candidate one of the media segments to be played at the improved quality.

FIG. 9 is a flow chart illustrating the process of step 408.

In sub-step 902, the processor 110 determines whether the request for forced improvement is received (i.e., the value of the flag (Fti)). When the determination is affirmative, the flow proceeds to sub-step 904. Otherwise, the flow proceeds to sub-step 906.

In sub-step 904, the processor 110 discards any data packet stored in the data buffer 1146 that constitutes the candidate one of the media segments. This is done to free up the space of the data buffer 1146 given that the user does not intend to view/listen to the candidate one of the media segments at the current quality anyway, regardless of possible occurrence of stalling.

In sub-step 906, the processor 110 controls the communication component 112 to start downloading the at least one new data packet.

In sub-step 908, the processor 110 determines whether a terminate event (e.g., the user closes the player interface 200) has occurred. When the determination is affirmative, the flow proceeds to sub-step 922, in which an exception handling process is executed. Otherwise, the flow proceeds to sub-step 910.

In sub-step 910, the processor 110 determines whether a network timeout, during which the network between the electronic device 106 and the server 102 becomes inaccessible, has occurred and is longer than a pre-calculated timeout threshold. Using the parameters of Table 1, and considering the time required for download of the at least one new data packet and the hardware performance capacity of the electronic device 106, the timeout threshold may be set at lower than 2 seconds.

When a network timeout is longer than the pre-calculated timeout threshold, the flow proceeds to sub-step 912. Otherwise, the flow proceeds to sub-step 916.

In sub-step 912, the processor 110 determines whether the request for forced improvement is received. When the determination is affirmative, the flow goes back to sub-step 906.

Otherwise, the flow proceeds to sub-step 914, in which the processor 110 discards a downloaded part of the at least one new data packet, and processes a corresponding one of the current data packets stored in the data buffer 1146 to play the candidate one of the media segments of the AV material at the current quality on the player interface 200. In this manner, while the improvement is unable to be achieved, the playing of the AV material may continue without having to pause.

In sub-step 916, the processor 110 determines whether the at least one new data packet is completely downloaded. When the determination is affirmative, the flow proceeds to sub-step 918. Otherwise, the flow proceeds to sub-step 922.

In sub-step 918, the processor 110 discards the data packet(s) stored in the data buffer 1146 constituting the candidate one of the media segments with the current quality. In sub-step 920, the processor 110 replaces the discarded data packet(s) with the at least one new data packet (e.g., using a pointer to insert the at least one new data packet), and processes the at least one new data packet, so as to control the renderer 150 to play the candidate one of the media segments at the target quality at the time when the candidate one of the media segments is expected to be played.

With the improvement for the media segment ($S_{11}$) completed, the flow of the method may go back to step 404 (see FIG. 4) to determine the value the flag (IsC). When it is determined that the flag (IsC) is false, the flow proceeds to step 406 for a next one of the media segments (i.e., the media segment ($S_{12}$)).

For example, as shown in FIG. 10, assuming that the downloading of the new data packet(s) for playing the media segment ($S_{11}$) at the target quality is completed 1.5 seconds after the start of the method (i.e., 00:31), the processor 110 may now determine whether a number of new packets constituting the media segment ($S_{12}$) with the target quality can be completely downloaded and processed before the playing of the media segment ($S_{12}$) is expected to start (i.e., 00:36). As a result, the associated parameters are updated as shown in the following Table 2.

TABLE 2

| Parameter | Value |
| --- | --- |
| Candidate index | 12 |
| Duration of current segment (seconds) | 3 |
| Offset (seconds) | 2.5 |
| Distance between the candidate segment and current segment | 1 |
| Time of download (seconds) | 3.5 |
| Current Bandwidth (bits per second) | 2000000 |
| Estimated downloadable amount (bits) | 5250000 |
| Duration of candidate segment (seconds) | 3 |
| Current quality | 3 |
| Target quality | 4 |
| New packet bitrate | 1172416 |
| New packet size | 3517248 |
| Determination | Affirmative |

Based on the above parameters, the processor 110 may determine in sub-step 710 that the new packet(s) constituting the media segment ($S_{12}$) with the target quality (level 4) can be completely downloaded and processed within 3.5 seconds, and the flow proceeds to sub-step 712 to start downloading the new data packets for the media segment ($S_{12}$) with the target quality.

The method may then be repeated sequentially for other media segments stored in the data buffer 1146.

At the playback time of $42^{nd}$ second (the start of the media segment ($S_{14}$)), as shown in FIG. 12, when the current bandwidth has dropped to 1200000 bps, the parameters are updated as shown in the following Table 3.

TABLE 3

| Parameter | Value |
| --- | --- |
| Candidate index | 15 |
| Duration of current segment (seconds) | 3 |
| Offset (seconds) | 0 |
| Distance between candidate segment and current segment | 0 |
| Time of download (seconds) | 3 |
| Current Bandwidth (bits per second) | 1200000 |
| Estimated downloadable amount (bits) | 2700000 |
| Duration of candidate segment (seconds) | 3 |
| Current quality | 3 |
| Target quality | 4 |
| New packet bitrate | 1172416 |
| New packet size | 3517248 |
| Determination | Negative |
| Candidate index | 16 |
| Time of download (seconds) | 6 |
| Estimated downloadable amount (bits) | 5400000 |
| Determination | Affirmative |

It is noted that due to the decrease of the current bandwidth, the processor 110 determines that the new packet(s) for improving the quality the media segment ($S_{15}$) cannot be completely downloaded in time. In turn, the processor 110 determines that, for the next one of the media segment ($S_{16}$), the 6-second time may be sufficient for fully downloading the new packet(s) for improving the quality of the media segment ($S_{16}$). As a result, the improvement for the media segment ($S_{16}$) is implemented.

As shown in FIG. 11, at the playback time of 00:50:5 second (2.5 seconds after the media segment ($S_{16}$) starts), without the downloading of additional data packets, it may be determined by the processor 110 that the playing duration (7.5 seconds) is now less than the threshold duration (10 seconds). In such a case, the processor 110 sets the flag (IsC) as true, and the method is terminated. The processor 110 then continues playing subsequent media segments with the data packets currently stored in the data buffer 1142, and starts controlling the communication component 112 to download the data packets constituting the media segments beyond the media segment ($S_{19}$).

According to one embodiment of the disclosure, during the playback of the AV material, the processor 110 is programmed to automatically perform an evaluation process for determining whether the at least one new data packet for playing the candidate one of the media segments at the improved quality is able to be completely downloaded during playback of the current one of the media segments, and to generate an icon in the icon set 230 of the player interface 200 indicating whether quality improvement is available, based on a result of the evaluation process. For example, the icon may be a green light when quality improvement is available.

When the user is notified visually that quality improvement is available, he/she may interact with the icon to transmit a user confirmation to the electronic device 106, and in response, the processor 110 may be programmed to download the at least one new data packet.

According to one embodiment of the disclosure, the processor 110 may further calculate the playing duration of the media segments based on the amount of the current data packets currently stored in the data buffer 1146, and further calculate an improvement duration based on the current network bandwidth. The improvement duration is a duration in which at least one of the media segments of the AV material is able to be played at the desired quality. Then, the icon generated on the player interface 200 may include the playing duration and a ratio of the improvement duration and the playing duration. For example, when the processor 110 calculates that four of the ten media segments may be improved to reach the desired quality, the processor 110 may control the player interface 200 to display the playing duration (0:30) and the ratio (40%), as shown in FIG. 2.

Figure 13:
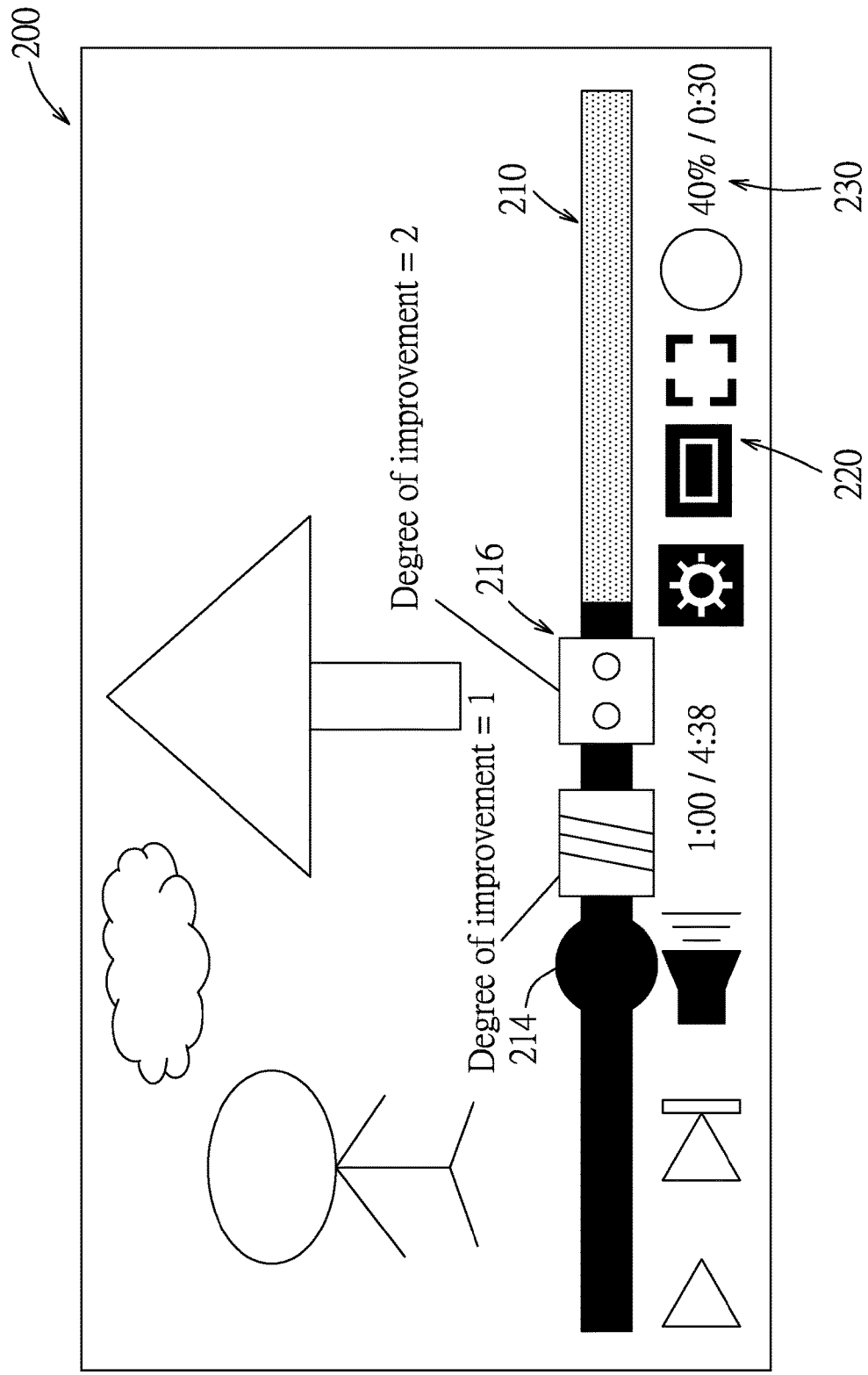
FIG. 13 illustrates an exemplary player interface for playing the audio/visual material according to one embodiment of the disclosure.

According to one embodiment of the disclosure, the above calculations may be presented on the player interface 200 in an even more intuitive manner. Specifically, as shown in FIG. 13, the media segment(s) deemed to have quality improvement available is highlighted as a corresponding part of the progress bar. It is noted that different colors may be used when various degrees of improvement are available.

According to one embodiment of the disclosure, when the user selects the pause function during the playback of the AV material, the processor 110 temporarily pauses the playback of the media segments. At this stage, other functions related to quality improvement of the media segments may be implemented.

In one example, while the playback of the AV material is paused, the user may input the request for quality improvement via the user interface 120. In response, the processor 110 may proceed to perform the quality improvement in a manner similar to that illustrated in FIG. 9.

Specifically, the processor 110 may start downloading replacement data packet(s) for playing the current one of the media segments (e.g., $S_{10}$) at the improved/target quality. After the replacement data packet(s) for the current one of the media segments is completely downloaded, the processor 110 may start downloading the replacement data packet(s) for playing a next one of the media segments (e.g., $S_{11}$) at the improved/target quality when it is determined that the playback of the AV material is still paused.

When the playback is resumed (by the user selecting the play function via the user interface 120), and it is determined that the replacement data packet(s) for playing the current one of the media segments is not yet completely downloaded, the processor 110 may discard the downloaded part of the replacement data packet(s) and resume the playback of the current one of the media segments at the current quality. Alternatively, the processor 110 may delay the playback until the replacement data packet(s) is completely downloaded, as if the request is one for a forced improvement.

In another example, in response to the selection of the pause function, the processor 110 may immediately start downloading the replacement data packet(s) for playing the current one of the media segments (e.g., $S_{10}$) at the improved/target quality. This action may be a selectable feature that may be enabled or disabled by the user.

When the playback is resumed, and it is determined that the replacement data packet(s) for playing the current one of the media segments is not yet completely downloaded, the processor 110 may similarly discard the downloaded part of the replacement data packet(s), or delay the playback of the current one of the media segments until the replacement data packet(s) is completely downloaded.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for adaptively streaming an audio/visual (AV) material, the method being implemented by an electronic device that includes a processor, a memory device having a data buffer, and a display, the data buffer storing a plurality of current data packets that constitute a plurality of successive media segments of the AV material, respectively, the method comprising:
   generating, by the processor, a player interface on the display;
   processing, by the processor, the current data packets stored in the data buffer to play the media segments of the AV material at a current quality on the player interface one by one;
   during playback of a current one of the media segments, determining, by the processor for a candidate one of the media segments after the current one, whether a new data packet for playing the candidate one of the media segments at an improved quality higher than the current quality is able to be completely downloaded before the candidate one of the media segments is expected to be played, based on a current network bandwidth of a network between the electronic device and a server that provides the new data packet, and an amount of the current data packets currently stored in the data buffer;
   when the determination is affirmative, downloading the new data packet; and
   processing, by the processor, the new data packet when the new data packet is completely downloaded and stored in the data buffer to play the candidate one of the media segments of the AV material at the improved quality on the player interface at the time when the candidate one of the media segments is expected to be played.

2. The method of claim 1, wherein determining whether the new data packet is able to be completely downloaded includes:
   identifying the current one of the media segments that is being played;
   selecting a next one of the media segments immediately succeeding the current one of the media segments as the candidate one; and
   determining whether a new data packet for playing the next one of the media segments at the improved quality is able to be completely downloaded before the next one of the media segments is expected to be played based on the current network bandwidth and the amount of the current data packets currently stored in the data buffer.

3. The method of claim 2, wherein determining whether the new data packet for playing the next one of the media segments at the improved quality is able to be completely downloaded includes:
   obtaining a degree of improvement, the degree of improvement indicating a difference between a level of the current quality and a level of the improved quality;
   estimating a downloadable amount of data before the next one of the media segments is to be played; and
   determining that the new data packet for playing the next one of the media segments at the improved quality is able to be completely downloaded when the degree of improvement is greater than zero and the downloadable amount of data is larger than a size of the new data packet.

4. The method of claim 3, wherein the degree of improvement is calculated based on a difference between a predetermined target quality and the current quality.

5. The method of claim 2, wherein determining whether the new data packet is able to be completely downloaded further includes:
   when it is determined that the new data packet for playing the next one of the media segments at the improved quality is not able to be completely downloaded before the next one of the media segments is expected to be played, selecting a following one of the media segments immediately succeeding the next one of the media segments as the candidate one; and
   determining whether a new data packet for playing the following one of the media segments at the improved quality is able to be completely downloaded before the following one of the media segments is expected to be played.

6. The method of claim 1, further comprising:
   after starting to download the new data packet for playing the candidate one of the media segments at the improved quality, when it is determined that a network timeout, during which the network between the electronic device and the server is inaccessible, longer than a pre-calculated timeout threshold has occurred, discarding a downloaded part of the new data packet; and processing a corresponding one of the current data packets stored in the data buffer to play the candidate one of the media segments of the AV material at the current quality on the player interface.

7. The method of claim 1, further comprising automatically performing, the processor, an evaluation process for determining whether the new data packet for playing the candidate one of the media segments at the improved quality greater is able to be completely downloaded during playback of a current one of the media segments, and to generate an icon on the player interface indicating whether quality improvement is available, based on a result of the evaluation process.

8. The method of claim 7, further comprising downloading, by the processor, the new data packet further when receiving a user confirmation via a user interface.

9. The method of claim 1, wherein the player interface generated by the processor includes a setting option enabling a user to manually set a desired quality.

10. The method of claim 9, wherein:
the evaluation process further includes calculating a playing duration of the media segments based on the amount of the current data packets currently stored in the data buffer, and calculating an improvement duration based on the current network bandwidth, the improvement duration being a duration in which at least one of the media segments of the AV material is able to be played at the desired quality; and
the icon generated on the player interface includes the playing duration and a ratio of the improvement duration and the playing duration.

11. The method of claim 1, further comprising determining, by the processor, whether the new data packet for playing the candidate one of the media segments at the improved quality is able to be completely downloaded in response to an externally inputted request via a user interface for a temporary quality improvement.

12. The method of claim 11, wherein the request is in the form of one of the following:
a predetermined gesture inputted via the user interface;
a physical gesture captured by a camera communicating with the processor;
an interaction with a button displayed on the player interface;
an interaction with one or more physical buttons on one of the electronic device and a remote device communicating with the electronic device; and
a voice command captured by a sound recorder communicating with the processor.

13. The method of claim 11, further comprising, after receipt of the externally inputted request, calculating a playing duration of the media segments based on the amount of the current data packets currently stored in the data buffer, and comparing the playing duration with a threshold duration;
when the comparing of the playing duration with the threshold duration shows that the threshold duration is longer than the playing duration, the processor terminating the method and continuing to play the current one of the media segments.

14. The method of claim 1, further comprising:
in response to a signal for pausing the playback of the current one of the media segments, downloading a replacement data packet for playing the current one of the media segments at the improved quality.

15. The method of claim 14, wherein the downloading of the replacement data packet is performed in response to an externally inputted request via a user interface for quality improvement.

16. The method of claim 15, wherein, in response to a signal for resuming the playback of the current one of the media segments, when it is determined that the replacement data packet is not yet completely downloaded, the processor discarding a downloaded part of the replacement data packet, and playing the candidate one of the media segments of the AV material at the current quality on the player interface.

17. An electronic device comprising a processor, a memory device having a data buffer and a display, the data buffer storing a plurality of current data packets that constitute a plurality of successive media segments of an audio/visual (AV) material, respectively, wherein said processor is programmed to perform operations including:
generating a player interface on the display;
processing the current data packets stored in the data buffer to play the media segments of the AV material at a current quality on the player interface one by one;
during playback of a current one of the media segments, determining, for a candidate one of the media segments after the current one, whether a new data packet for playing the candidate one of the media segments at an improved quality higher than the current quality is able to be completely downloaded before the candidate one of the media segments is expected to be played, based on a current network bandwidth of a network between the electronic device and a server that provides the new data packet, and an amount of the current data packets currently stored in the data buffer;
when the determination is affirmative, downloading the new data packet; and
processing the new data packet when the new data packet is completely downloaded and stored in the data buffer to play the candidate one of the media segments of the AV material at the improved quality on the player interface at the time when the candidate one of the media segments is expected to be played.

18. The electronic device of claim 17, wherein the operation of determining whether the new data packet is able to be completely downloaded includes:
identifying the current one of the media segments that is being played;
selecting a next one of the media segments immediately succeeding the current one of the media segments as the candidate one; and
determining whether a new data packet for playing the next one of the media segments at the improved quality is able to be completely downloaded before the next one of the media segments is expected to be played based on the current network bandwidth and the amount of the current data packets currently stored in the data buffer.

19. A non-transitory computer-readable medium storing instructions that, when executed by a processor, cause the processor to perform operations comprising:
generating a player interface on a display of an electronic device;
processing a plurality of current data packets that are stored in a data buffer of a memory device and that constitute a plurality of successive media segments of an audio/visual (AV) material, so as to play the media segments of the AV material at a current quality on the player interface one by one;

during playback of a current one of the media segments, determining, for a candidate one of the media segments after the current one, whether a new data packet for playing the candidate one of the media segments at an improved quality higher than the current quality is able to be completely downloaded before the candidate one of the media segments is expected to be played, based on a current network bandwidth of a network between the electronic device and a server that provides the new data packet, and an amount of the current data packets currently stored in the data buffer;

when the determination is affirmative, downloading the new data packet; and processing the new data packet when the new data packet is completely downloaded and stored in the data buffer to play the candidate one of the media segments of the AV material at the improved quality on the player interface at the time when the candidate one of the media segments is expected to be played.

20. The non-transitory computer-readable medium of claim 19, wherein the operation of determining whether the new data packet is able to be completely downloaded includes:

identifying the current one of the media segments that is being played;

selecting a next one of the media segments immediately succeeding the current one of the media segments as the candidate one; and determining whether a new data packet for playing the next one of the media segments at the improved quality is able to be completely downloaded before the next one of the media segments is expected to be played based on the current network bandwidth and the amount of the current data packets currently stored in the data buffer.

* * * * *